United States Patent [19]

Turner

[11] Patent Number: 4,622,072

[45] Date of Patent: Nov. 11, 1986

[54] SURFACE COATING COMPOSITIONS

[75] Inventor: John H. W. Turner, Stockport, England

[73] Assignee: Alcan International Limited, Quebec, Canada

[21] Appl. No.: 683,313

[22] Filed: Dec. 18, 1984

[30] Foreign Application Priority Data

Dec. 22, 1983 [GB] United Kingdom ............... 8334267

[51] Int. Cl.$^4$ .................. C08L 91/00; C08K 5/00
[52] U.S. Cl. .................... 106/252; 106/264; 106/310; 524/399
[58] Field of Search ............ 106/252, 264, 310; 524/399

[56] References Cited

U.S. PATENT DOCUMENTS

| 2,308,988 | 1/1943 | Mathes | 106/243 |
| 2,414,427 | 1/1947 | Zurcher | 106/287 |
| 3,298,848 | 1/1967 | Wachholtz et al. | 106/264 |
| 4,221,685 | 9/1980 | Eschwey et al. | 106/252 |
| 4,264,370 | 4/1981 | Turner | 106/310 |

FOREIGN PATENT DOCUMENTS

| 931188 | 7/1955 | Fed. Rep. of Germany . |
| 2308988 | 3/1976 | France . |
| 907558 | 10/1962 | United Kingdom . |
| 972804 | 10/1964 | United Kingdom . |
| 1434191 | 5/1976 | United Kingdom . |
| 1462610 | 1/1977 | United Kingdom . |
| 1544405 | 4/1979 | United Kingdom . |

Primary Examiner—Theodore Morris
Attorney, Agent, or Firm—Lowe, Price, LeBlanc, Becker & Shur

[57] ABSTRACT

Coating compositions are disclosed comprising a conventional paint medium and an aluminium compound such as aluminium alkoxide which is stabilized by a volatile base, preferably an amine, together with added water.

The coating compositions remain stable on prolonged storage.

10 Claims, No Drawings

SURFACE COATING COMPOSITIONS

This invention relates to improved surface coating compositions. It is known that aluminium alkoxides and certain derivatives of aluminium alkoxides by substitution or condensation reactions, contribute important improvements to the performance of paints. Typical benefits include improved "through drying" of the applied film of paint which is especially noticeable when it is applied at film thicknesses greater than normal. Aluminium compounds also benefit the drying process by reducing the surface tackiness of the dried film. This reduces the risk of mechanical damage to the film and, on exposure to atmospheric conditions, reduces contamination of the film by retained dirt. Other benefits attributable to these aluminium compounds in paints are a reduced tendency for the paint to discolour by "yellowing" on ageing, and less tendency to absorb water when dried film is subjected to prolonged water immersion. It is thought that this improvement in water-resistance shown by paints containing these aluminium compounds is a major contributing factor to their improved durability as manifested by prolonged gloss-retention and delay in the onset of chalking of paints pigmented with titanium dioxide when exposed to artificial or natural weathering. This improvement in water resistance may also be responsible for the increased resistance to biochemical action which has been observed when oil and oleo-resinous paints containing additions of these aluminium compounds are exposed to natural weathering.

Preferred aluminium compounds for use as components of paints include a first group comprising those derived from aluminium tri-alkoxides and, particularly, from aluminium tri-isopropoxide, aluminium tri-sec.-butoxide, and aluminium tri ethoxyethoxide, and aluminium trimethoxypropoxide. They may be modified in composition and properties by substitution reactions with one or more of the alkoxide groups by a higher alcohol, a tautomeric compound such as acetyl acetone, acetoacetic ester or an ester of malonic acid, by a phenol or by a suitable carboxylic acid. The alcohol thus liberated by the substitution reaction may optionally be removed by distillation. A preferred substituent for at least one of the alkoxide groups is the enolic form of a tautomeric compound such as an alkyl ester of acetoacetic acid because of the valuable contribution this group of substituents makes to the enhancement of hydrolytic stability of the substituted aluminium alkoxide. Other substituents may be employed to contribute other specific properties relevant to the application for which the substituted aluminium alkoxide is required.

The second group of aluminium compounds comprises condensation products of aluminium alkoxides in which not less than one and usually two alkoxide groups are replaced by an oxygen atom linking two aluminium atoms in a polycondensed compound represented by the general formula $$(-O_p - Al - X_q)_r, \text{ where } p = \frac{3-q}{2}$$

and q is more than 0 and less than 2 and r is 2 or more, and X is an alkoxide, phenoxide, enolate or acyloxide group or a mixture thereof.

The improvements in paint performance conferred by aluminium compounds of these two types are particularly noticeable when the paint medium is a drying oil, a polymerised drying oil, drying oils of all types incorporating oil-soluble resins, and drying oil modified alkyd resins of the type widely employed as media for air-drying decorative and protective paints. These improvements are also more clearly discernible in white paints pigmented with titanium dioxide than they are in some coloured paints in which discoloration is less of a problem and in which the opacity of the pigment to certain wavelengths of light may provide protection for the medium against the effects of oxidative degradation. Nevertheless, most paints of most colours have been found to show some significant advantages in performance from the inclusion of these aluminium compounds.

The reasons for these improvements are not yet fully understood but are believed to result from the ability of the aluminium compound to interact by addition and/or substitution reactions or by co-ordination with reactive groups present in the other components of the paint and, notably, in the medium and pigment. It is postulated that this interaction results in a macromolecular structure which accounts for the major improvement in through-drying and provides a structure more resistant to water penetration and to oxidative degradation. The diminished chalking of paints containing titanium pigments may follow from the closer chemical association of this pigment with the aluminium modified medium in which it is dispersed.

The rate and extent of the reaction between either type of aluminium compound and the paint in which it is incorporated will depend upon the composition and the reactivity potential of the particular aluminium compound for the paint and on the composition and reactivity potential of the particular paint for the aluminium compound.

Unfortunately, these same structural changes are responsible also for the major disadvantage which arises from the use of aluminium compounds in paint, that is, a variable but unacceptable tendency for the liquid paint to become more viscous after the addition of the aluminium compound and, frequently, to thicken to the gel stage and become unusable.

Various methods have been proposed for overcoming this disadvantage accompanying the use of aluminium compounds in paints. One known method involves keeping separate the aluminium compound from the paint component until a short time before the paint is required to be applied. In some instances this does provide a practical solution to the problem of limited storage stability but, for a number of reasons, it is not widely acceptable. One problem is that this method requires reliable judgement by the paint user in relating the amount of paint to mix to the amount the user expects to apply within the "pot-life" time of the mixed paint. If too much paint has been mixed, the painter may avoid the waste of discarding the excessively thickened paint by diluting it, at the limit of its "pot-life" with volatile diluent to reduce its consistency to a level suitable for satisfactory application. The lower solids content of the diluted paint will tend to reduce the thickness of the applied film and reduce both the protective and decorative value. This may necessitate the costly application of an additional coat of paint to compensate.

Another proposed method involves adding to the paint an amount of the aluminium compound sufficient to cause the paint to thicken but not to gel. When the thickening is adjudged to be complete the paint is thinned to application consistency by the addition of a volatile solvent such as white spirit. This method is considered satisfactory only when small additions of the aluminium compound are required and higher than normal dilution with solvent is tolerable. It is quite unsuitable for use at aluminium contents high enough to react with most of the available reactive groups in the paint medium, especially when media of high reactivity are employed and paints of normal solids content are required.

Air drying compositions are described in British patent specification No. 1,462,610 comprising an oil modified alkyd resin or oleo-resinous medium together with an aluminium complex derived from an aluminium alkoxide and incorporating a "labile monofunctional reactant". However, with viscous alkyd resin media having acid values from 6 to 10 or more, stability is dependent upon reducing the acid value by treating the alkyd resin with a suitable oxirane compound. This post treatment is an additional processing stage which adds to the complexity of the paint-making process and increases its cost. It also involves a significant change in the paint's composition which may affect adversely its performance as a protective and decorative coating.

British patent specification No. 1,434,191 describes compounds or composites with resins, pigments and fillers, of aluminium compounds derived from aluminium alkoxides by substitution reactions. These composites employ an excess of aluminium compound to "cap" the reactive groups of the resin, pigment or filler by mono-substitution or addition reactions. A limitation of this process is the generally high content of aluminium necessary for efficient capping; as well as being costly, this tends to increase the rigidity of the composite which may therefore fail to satisfy flexibility requirements.

Paints employing aluminium alkoxides and some substituted aluminium alkoxides as components have generally proved to be more difficult to stabilise than paints incorporating a similar amount of aluminium but in the form of a condensed oxo aluminium compound. However, the reactivity of most aluminium alkoxides can be reduced by replacing one or more of the alkoxide groups by appropriate substituents. The most effective of those dislosed appear to be the enolic form of tautomeric compounds. These enolate substituents are particularly good in reducing the sensitivity to hydrolysis of aluminium alkoxides and aluminium alkoxides which have also been partially substituted by other radicals such as higher alkoxides, phenoxides and acyloxides. Substituents which reduce the reactivity of the aluminium compound may have a useful role as stabilisers but the diminished reactivity of the aluminium compound is liable to make it less effective in converting the paint medium and other reactive constituents of the paint into the resistant and durable gel produced by unsubstituted or less substituted aluminium alkoxide. Furthermore, some substituents, notably those which are vulnerable to oxidation, are liable to detract from other desirable properties conferred by the aluminium compound on the paint.

German patent specification No. 931,188 describes varnishes and coating materials comprising alcoholates of multivalent metals or synthetic resins formed from the metal alcoholates and tautomeric reacting keto- and enol-groups and including small amounts of monoamines. The primary object of the process described in German patent specification No. 931,188 was to improve the gloss of the resulting coating. In checking the examples of the reference and specifically Example 1, we found that the drying of the compositions was inadequate and completely unsatisfactory at least by today's standards. Moreover German patent specification No. 931,188 does not disclose or suggest the use of any secondary stabiliser such as water, which is an essential component of the composition according to the present invention.

We have now found how to provide paints and unpigmented surface coating compositions incorporating aluminium compounds with polymerised drying or semi-drying oil, alkyd resins or oleo-resinous media of varying compositions and reactivity which remain stable on prolonged storage and are substantially free from the limitation of stability and the adverse effect on some other properties which characterise the compositions just described.

The invention provides paint and unpigmented surface coating compositions comprising
  (i) a paint medium which may be pigmented or unpigmented and which includes a drying or semi-drying oil, an oil soluble resin and/or an oil-modified alkyd resin;
  (ii) at least one aluminium compound which is an aluminium alkoxide or a compound derived from an aluminium alkoxide by an addition, substitution or condensation reaction;
  (iii) a primary stabiliser comprising at least one volatile base which is ammonia, aqueous ammonia, an alkylamine, a cycloalkylamine, an arylamine, or an alkanolamine, or compounds of any of these such as hydrates or salts or esters or ethers of an alkanolamine which, by dissociation, may release ammonia or an amine; and,
  (iv) added water as a secondary stabiliser.

The invention also provides reaction products obtained by the mixing of ammonia, aqueous ammonia, an alkylamine, or cycloalkylamine, an arylamine or an alkanolamine or compounds thereof such as those previously mentioned and water with an aluminium alkoxide or an aluminium compound derived from an aluminium alkoxide, by an addition, substitution or condensation reaction.

Paint media suitable for use in or with the products of the invention include those incorporating drying oils or fatty acids such as linseed oil, semi-drying oils such as soya bean oil or polyol esters of tall oil fatty acids. The drying and semi-drying oils are most preferred and may be used unpolymerised or as polymerised "stand oils" having a viscosity of, preferably, in the range 7 to 200 poises at 25° C., more preferably, between 20 and 70 poises at 25° C. Unpolymerised drying and semi-drying oils are preferably not used as the sole components but may be used as major components of the paint medium with minor additions of oil soluble hard resins, or as minor components added to oil modified alkyd resin media to improve application and drying properties.

More generally preferred components of the paint media are alkyd resins incorporating, as modifying components, variable amounts of drying, semi-drying and non-drying fatty acids in the form of their partial esters with the polyol component of the alkyd resin. The preferred alkyd resins have a combined fatty acid content falling within the range of 20% to 85%. The selection of specific alkyd resins depends primarily on the properties required for the application. For example, industrial coatings for spray application will preferably employ, as their medium, alkyd resins having a content of fatty acid within the range 30% to 60%. Air-drying coatings for other industrial protective and decorative coatings required for brush application preferably employ, as their medium, less viscous alkyds with a higher content of fatty acid within the range 55% to 65%. For most other air-drying gloss paints such as those designated "architectural finishes", or for retailing to the "do-it-yourself" customer and for paints requiring the minimum of volatile diluent, such as white spirit, the preferred medium comprises alkyd resins or oligomers with a content of fatty acid in the range 60% to 80%. In addition to their variable content of combined fatty and other acids, alkyd resins, oil-soluble resins and other oleoresinous materials vary in their content of unesterified acid. This is known as the "Acid Value" and is expressed as the "number of milligrams of potassium hydroxide required to neutralise the acid content of 1 gram of the medium." Most of the acidity is attributable to the content of incompletely esterified polybasic acid, such as phthalic half ester, remaining in the resin at the completion of its manufacturing process. Thus, alkyd resins which have a high content of polybasic acid and a low content of fatty acid are more likely to be relatively high in acid value. Accordingly, alkyd resins having a fatty acid content in the range of 20% to 65% may be expected to have acid values ranging from 70 down to 12 mgms.KOH/gm. whereas those alkyds in the range of 55% to 85% fatty acid content may be expected to have acid values ranging from 15 to 5 mgms.KOH/gm. This free acid content of alkyd resins is the major reactant with the aluminium compounds of the invention and a major cause of thickening of alkyd media to which aluminium compounds have been added. On the other hand, reaction of the free acid content of the paint medium with its aluminium component is a major factor in the conversion of the applied film from the liquid to the gelled state. The stabilisers of the invention make possible the achievement of a stable liquid state while the paint is being stored in its container and the achievement of desirable drying properties when the paint film is applied.

Another variable in the composition of alkyd resins is the hydroxyl value i.e. the residual content of hydroxyl groups derived from the polyol component of the resin left unesterified at the end of the manufacturing process. The hydroxyl group content in alkyd resins is generally considerably higher than the free carboxylic acid group content. Many of these hydroxyl groups, which are not stericly impeded, are reactable, by substitution with alkoxide groups present in some of the aluminium compounds of the invention. Instability on storage, thought to be attributable to this reaction, can be prevented by the addition of the water stabiliser of the invention.

Yet another variable which may affect the stability with aluminium compounds of all types of paint media incorporating drying and semi-drying oils, is thought to be attributable, directly and indirectly, to the ethylenic unsaturation of the fatty ester component of the medium. We have found that oils of high ethylenic unsaturation, such as linseed oil with iodine values in the range 170 to 190, are more likely to result in thickening with aluminium compounds than are oils of lower unsaturation such as soya bean oil with a typical iodine value of about 130. Furthermore, if the unsaturation is conjugated, such as would be the case with esters of conjugated linoleic acid, or triply conjugated as in the case with the glyceryl eleostearate component of Tung oil, the reaction with aluminium compounds is further enhanced. It is postulated that this reactivity is due to activation of methylene groups in the fatty ester by neighbouring unsaturation. The reactivity attributed to methylene groups appears to be further increased by oxidation. This is thought to be due, primarily, to the formation of hydroperoxide groups. Some of the amine stabilisers of the invention have proved effective in controlling the reactivity of these oxidised oils and preventing their thickening with aluminium compounds when they are used as paint media, but when the paint is applied its gelation potential is restored.

Paint media used in the compositions according to the invention also include fatty esters of polyols derived from resins containing epoxide or hydroxyl groups and fatty esters resulting from the direct esterification of hydroxyl groups pendant in vinyl and other linear polymers or, indirectly, by transesterification of polymer substituents in vinyl acetate polymers and co-polymers by an ester of a higher fatty acid.

The intrinsic viscosity of the medium is a guide to its potential reactivity with the aluminium compounds of the invention, increase in viscosity indicating increased reactivity and reduction in viscosity indicating likely reduced reactivity.

The aluminium compound may be, for example, an aluminium alkoxide or derivative thereof formed by substituting one or more of the alkoxide radicals and having the general formula $AlX_3$ where X is an alkoxide such as isopropoxide, a cycloalkoxide such as cyclohexyloxide or a substituted alkoxide such as xethoxypropoxide, or a phenoxide or an alkyl, aryl or halogenated phenoxide; the enolate form of a beta diketone, a beta keto-carboxylic ester or a malonic ester; an aryloxide; an acyloxide; or a mixture thereof; or a condensed derivative of an aluminium alkoxide or a substituted aluminium alkoxide having the general formula $(-O_p-Al-X_q)r$ where X is as previously defined and r is 2 or more, p is less than 1.5 and not less than 0.5 and q is 3-2p.

The aluminium compound is preferably employed in a proportion of 0.5% to 8% Al based on non-volatile components of the medium; increased Al content resulting in improved through-drying to provide films of greater hardness and rigidity which, when immersed in water, show a progressively reduced tendency to absorb water.

The minimum requirement of aluminium compound, in terms of its elemental Al content, can be related to the acid value of the medium, thus: Minimum aluminium requirement as $$Al = \frac{27}{56} \times \frac{A.V. \text{ of Medium } \%}{10}$$

(where AV=acid value as previously defined). This provides one Al atom for each carboxylic acid group present in the medium. Relating this to the acid value limits envisaged for the preferred alkyd media, the minimum requirement of Al for a medium of A.V. 5 would be 0.24 gms.Al/100 gms. medium (non-volatile component); for an A.V. of 70 the minimum would be 3.38gms.Al/100 gms. of non-volatile medium. It is necessary to make an additional allowance for the presence in the medium of other reactive groups competing for the aluminium, notably hydroperoxides in the fatty acylate component of the medium and reactive hydroxyls located on the surface of any pigments or fillers used, at their interface with the medium. These considerations justify an increase in the minimum Al% on non-volatile medium to 0.5% and 4.0% respectively. The corresponding maxima for Al content include allowances for the high hydroxyl content of most alkyd media and the progressive generation, within the dried paint film, of more reactive groups as a result of ongoing oxidation of the fatty acylate component. In the case of alkyd media of low acid value and having a fatty acid content of between 60% and 80%, the proposed maximum content is 4% Al and the estimated, preferred average is expected to lie between 1 and 2% on non-volatile medium. In the case of alkyd media of 30% to 50% fatty acid content and acid value up to 70, the proposed maximum Al content is raised to 8% based on non-volatile medium. This includes an allowance for the substantially higher content of hydroxyl groups to be expected in alkyd resins of this type.

As well as the content of "elemental aluminium" in the aluminium compounds used in the present invention other compositional aspects which influence paint properties include the content of polar components such as free and combined alcohols which, while retained in the paint film, may have a peptising action on its macromolecular/micellar structure. This can be helpful in aiding application and promoting flow properties and, at moderate temperatures, the drying of the applied film. At low temperatures, however, the retention in the film of polar solvent may have an unacceptably persistent retarding effect on drying rate. This disadvantage can be minimised by the use under low temperature drying conditions, of oxo aluminium compounds from which the alcohol content of the aluminium oxide has been removed by hydrolysis, condensation and distillation, to provide a highly effective, alkydcompatible aluminium compound, in a non-polar, hydrocarbon diluent.

The most preferred substituent for use in the aluminium products of the invention is ethylacetoacetate in its enolate form which has a low volatility. This substituent provides a high level of compatibility with most media of the invention and contributes to the aluminium compound, excellent storage stability and adequate resistance to hydrolysis by atmospheric moisture. The alternative, or partial, use of other alkoxy, acyloxy or phenoxy substituents may, however, be desirable for some applications requiring specific compatibility, reactivity and other property benefits.

Preferred aluminium compounds are aluminium alkoxides which have been partially substituted by reaction with a tautomeric compound such as ethyl acetoacetate in its enolic form and, most preferably, from which the by-product alcohol of the substitution reaction has been removed by distillation and replaced optionally, wholly or in part, by hydrocarbon which may be aliphatic, cycloaliphatic, aromatic, saturated or unsaturated or halogenated, by ketone, ester or by ether diluent.

Also preferred are aluminium alkoxides which have been partially substituted by reaction with a tautomeric compound such as ethyl acetoacetate and, more preferably, subsequently partially hydrolysed by the addition of sufficient water to hydrolyse up to half the residual combined alkoxide content of the substituted aluminium compound and then condensed by heating and the alcohol by-product of the substitution, hydrolysis and condensation reactions removed by distillation and replaced, if desired by hydrocarbon, halogenated hydrocarbon, ester, ketone or ether diluent.

According to the present invention the stabiliser is preferably ammonia, an alkylamine, cycloalkylamine or an alkanolamine which may be used singly, as mixtures of two or more, or in the form of dissociatable compounds as previously described. The amine stabiliser may be a primary, secondary or tertiary amine and preferably has a boiling point in the range of 40° to 240° C.

The choice of primary stabilisers will depend on the composition and properties of the other components of the paint and particularly on the oil or oleo-resinous medium and the particular aluminium compound used with it. The choice of primary stabiliser will also depend on the contribution it makes to other properties of the paint, for example, compatibility, toxicity, odour, drying rate, colour stability of the applied film and its durability on exposure to weathering and atmospheric pollution. Examples of primary stabilisers which have proved suitable for use in specific paint compositions include ammonium hydrate, diethylamine, mono n-butylamine, morpholine, piperidine, dimethylaminoethanol and diethylaminoethanol. Of these, and because of their wide ranging utility, the most preferred are dimethylaminoethanol and diethylaminoethanol.

The primary role of the volatile base stabiliser is to delay, until after the paint film is applied, the reaction which would normally take place between the reactive components of the unstabilised paint medium and the unstabilised aluminium compounds of the invention. Such a reaction gives rise to the formation of progressively less fluid, macromolecular reaction products and results in gelation. This is desirable in the applied film but unacceptable when its premature occurence results in storage instability of the packaged paint.

The component of the paint medium most responsible for its reactivity with aluminium compounds is the combined carboxylic acid quantified by the acid value of the medium. The neutralising capacity of the volatile bases of the invention compared with the potassium hydroxide used to determine the acid value of the paint medium can be expressed by the factor F where $$F = \frac{\text{Equivalent weight of Base}}{E.W. \text{ of KOH (56)}}$$

The amount of Base needed to neutralise the acid content of the medium may then be expressed as (F × Acid value) mgms./gm. medium, or $$\frac{F \times \text{Acid value}}{10} \% \text{ of medium}$$

For example, the base dimethylaminoethanol has an E.W. of 89 and a value for F of 89/56=1.59. Likewise, the orthoboric ester of dimethylaminoethanol is a triamine with a molecular weight of 323 and, therefore, an E.W. of about 108. It therefore has a value for F of 108/56=1.93.

The theoretical minimum amount of dimethylaminoethanol needed to neutralise the acid content of an alkyd resin of acid value 5 would therefore be 0.8% of the weight of the resin contained in the medium. To neutralise the acid content of a medium employing a resin of A.V.70 would require 11.1% of dimethylaminoethanol on the weight of resin to be neutralised. The corresponding requirements of dimethylamino orthoborate to neutralise these two media would be, respectively, 0.97% and 13.5% of the alkyd weight.

The addition of water as a secondary stabiliser is seen to be most effective in preventing the thickening of paints containing aluminium compounds when the compound used has a high residual content of a lower alkoxide such as isopropoxide, secondary butoxide, ethoxyethoxide or methoxy propoxide. The use of water as an addition with amine stabilisers generally has a less marked stabilising action on paints incorporating oxo aluminium compounds of relatively low alkoxide content. But some addition of water generally makes a significant contribution to stability on prolonged storage of all paints containing aluminium compounds and also makes possible a reduction in the amount of amine needed to provide the requisite stability.

Water in appropriate amounts may be introduced in different ways to the composition according to the invention. For example, water, as such, may be added directly to the oil, alkyd or oleo-resinous paint medium, before or after any optional pigmentation; or water may be added to the paint medium, before or after any optional pigmentation, as the hydrate of ammonia or of the amine used as primary stabiliser, or it may be added as a solution in an appropriate common solvent for water and the medium to which the addition of water is required. Another possibility is to introduce the water, pre-mixed with ammonia or the amine stabiliser, to the aluminium compound first and the resulting pre-mix of primary and secondary stabilisers with the aluminium compound is then added to the paint medium before or preferably, after any optional pigmentation.

In practice, the amine and water stabilisers appear to combine synergistically with resulting economy in the use of the stabilising bases. This is most apparent when they are used together as direct additions to paint media at, or before, pigmentation. The heat produced in the mechanical process of pigment wetting and dispersion expedites neutralisation which, in turn, aids pigment wetting and dispersion. The combination of heat and water provide effective peptisation and reduced functionality. The subsequent addition of alkoxide containing aluminium compounds is mildly exothermic due to their reaction with the water but is not accompanied by the viscosity increase typical of aluminium alkoxide reactions with anhydrous paint media.

Practical tests have indicated that the water addition should be not less than half the amount needed to hydrolyse the alkoxide content of the aluminium compound to be added to the paint medium and, generally, not more than twice this minimum requirement. When the aluminium compound is an oxo aluminium compound, substantially free from alkoxide components, less water is necessary and that amount which is found to be desirable may best be added as the mono-hydrate of the preferred amine stabiliser.

Drying of the applied films of the stabilised paints of the invention is attributable to the progressive loss from the applied film of both volatile solvent and, by dissociation, the stabilising base, releasing the aluminium/medium gelation potential. Concurrently, it is postulated that oxidation of the unsaturated fatty acylate component of the medium provides further reaction potential through the formation of hydroperoxide substituents capable of reacting with the aluminium compound and also of initiating the conversion, by free radical initiated polymerisation, of the gel structure into a cross-linked gel with mechanical and other properties formulated to be appropriate to its application requirements. The processes of oxidation and polymerisation are, preferably, accelerated by the addition of appropriate catalysts or driers. The use with the products of the invention of lead paint driers and/or calcium and barium auxiliary paint driers has been found to be unnecessary and, generally, undesirable.

The invention is illustrated by the following Examples.

Preparations

The Preparations used as components of the Examples which follow comprise a selection of conventional oil and alkyd paint media, aluminium organic compounds of known type and performance, and amines, hydrated amines and other amine compounds used without and with added water in the Examples to demonstrate their contribution to improvements in the stability of paint media improved in their other aspects of performance by the inclusion of aluminium organic compounds.

1. Drying oil and Alkyd media

The paint media used in the Examples comprise commercially available polymerised drying oils and a selection of alkyd resin solutions of composition appropriate to a range of surface coating applications.

The drying oils comprise a moderately highly polymerised linseed stand oil (Preparation 1.1) and a polymerised pentaerithrytol ester of a linoleic rich fatty acid fraction derived from Tall oil (Preparation 1.2).

The alkyd media used were made from four resins having the compositions and specifications given (Preparations 1.3 to 1.6) which were diluted appropriately and modified by the addition of paint drier (cobalt naphthenate solution) and anti-skinning agent (Methyl ethyl ketoxime). The resulting media comprised Preparations 1.3.1, 1.4.1, 1.5.1 and 1.6.1, 1.6.2 and 1.6.3.

2. Aluminium Compounds

Three types of aluminium compound are used to provide the aluminium compound Preparations used in the subsequent Examples.

The first type comprises aluminium alkoxides, aluminium alkoxo acids and substituted alkoxides and provides four Preparations (2.1.1 to 2.1.4).

The second type comprises oxo aluminium compounds made by condensing partially hydrolysed derivatives of partially substituted aluminium alkoxides. It provides the Preparations (2.2.1 and 2.2.2).

The third type comprises uncondensed hydroxyl substituted alkoxides and partially substituted alkoxides prepared in the form of a dispersion. It provides the single Preparation (2.3.1).

3. Aqueous Amine Preparations

Ammonium hydrate and a number of amines which are commercially available were used in the Examples with and without the addition of water.

Additionally, nine amines were pre-mixed with water to provide monohydrate Preparations (3.1 to 3.9) for use in the Examples.

4. Preparations of Amine Compounds

Compounds of amines prepared for inclusion in the Examples comprise two amine salts of carboxylic acids Preparations (4.1.1 and 4.1.2).

Preparations used in the Examples

1. Drying oil and alkyd resin components of paint media

1.1 Polymerised drying oil

A preparation of linseed stand oil polymerised to a viscosity, at 25° C., of 160 poises and having an acid value of 6.6 mgms.KOH/gm.

1.2 Polymerised fatty ester

A polymerised ester of pentaerithrytol and a fatty acid fraction derived from Tall oil and having the following properties:

| | |
|---|---|
| Acid value | 22 mgms · KOH/gm |
| Viscosity (25° C.) | 162 poises |
| Viscosity at 25° C. of 75% solution in white spirit | 4 poises |

1.3 Alkyd resin Preparation

A proprietary alkyd resin derived from linseed oil, phthalic anhydride and pentaerithrytol and having the following composition and properties:

| | |
|---|---|
| Oil length (as fatty acid) | 70% |
| Phthalic acid content | 20% |
| Acid value | 9.6 mgm · KOH/gm |
| Viscosity at 25° C. of 75% solution in white spirit | 56 poises |
| Solids content of solution in white spirit having a viscosity at 25° C. of 2 poises | 52% |

Preparation 1.3 was used to provide a paint medium 1.3.1 having the following composition:

| | | |
|---|---|---|
| | Alkyd resin 1.3 | 100 parts by weight |
| | White spirit | 80 parts by weight |
| | 6% Cobalt naphthenate solution | 1 part by weight |
| | Methyl ethyl ketoxime | 0.25 parts by weight |

1.4 Alkyd resin Preparation

A proprietary alkyd resin derived from a linoleic rich fatty acid fraction, phthalic anhydride and pentaerithrytol having the following composition and properties:

| | |
|---|---|
| Oil length (as fatty acid) | 65% |
| Phthalic acid content | 24% |
| Acid value | 9 mgs · KOH/gm |
| Viscosity at 25° C. of 75% solution in white spirit | 32 poises |
| Solid content of solution in white spirit having a viscosity of 25° C. of 2 poises | 55% |

Alkyd resin 1.4 was used to provide a paint medium 1.4.1 having the following composition:

| | | |
|---|---|---|
| 1.4.1 | Alkyd resin Preparation 1.4 | 100 parts by weight |
| | White spirit | 82 parts by weight |
| | 6% Cobalt drier | 1 part by weight |
| | Methylethyl ketoxime | 0.25 parts by weight |

1.5 Alkyd resin Preparation

A proprietary alkyd resin of medium oil length and supplied as a solution in white spirit having a non-volatile content of 50% of the following composition and properties:

| | |
|---|---|
| Oil length (as fatty acid) | 55% |
| Oil type | Linoleic acid |
| Polyol | Pentaerithrytol |
| White spirit content | 50% |
| Acid value | 9 mgms · KOH/gm. |
| Viscosity (25° C.) | 28 poises |
| Solids content of solution in white spirit having a viscosity at 25° C. of 2 poises | 41% |

Alkyd resin Preparation 1.5 was used to provide a paint medium 1.5.1 having the following composition and properties:

| | | |
|---|---|---|
| 1.5.1 | Alkyd resin solution 1.5 | 200 parts by weight |
| | Xylene | 20 parts by weight |
| | 6% Cobalt drier | 1 part by weight |
| | Methyl ethyl ketoxime | 0.25 parts by weight |
| | Alkyd non-volatile content | 42.2% by weight |
| | Viscosity 25° C. | 4 poises |

1.6 Alkyd resin Preparation

An alkyd resin derived from a linoleic rich fatty acid fraction, a mixture of glycerol and trimethylolpropane and of isophthalic acid and trimellitic anhydride, and formulated for dilution with solvents appropriate to its primary use as a resinous medium for water reducible paints.

The resin Preparation complied with the following composition and property requirements:

| | |
|---|---|
| Oil length (as fatty acid) | 36% |
| Isophthalic acid content | 30% |
| Trimellitic anhydride content | 10% |
| Acid value | 56 mgms · KOH/gm |

Three solutions of resin Preparation 1.6 were prepared for use in the Examples as follows:

| | 1.6.1 | 1.6.2 | 1.6.3 |
|---|---|---|---|
| Alkyd Preparation 1.6 | 700 | 700 | 700 |
| Butanol | 60 | 100 | 80 |
| Methoxypropanol | 60 | — | 72 |
| Butoxyethanol | 60 | 100 | 100 |
| Dimethylaminoethanol | 80 | 100 | — |
| .880 Ammonia | — | — | 48 |
| Water | 40 | — | — |
| Total | 1000 | 1000 | 1000 |
| Alkyd % | 70 | 70 | 70 |

2. Aluminium Compounds

2.1 Aluminium alkoxides, substituted alkoxides and alkoxo acids

| | 2.1.1 | 2.1.2 | 2.1.3 | 2.1.4 |
|---|---|---|---|---|
| Aluminium tri-isopropoxide[1] | 210 | 420 | — | — |
| Aluminium triethoxyethoxide[2] | — | 300 | 300 | 300 |
| Ethyl acetoacetate | 130 | 390 | 130 | — |
| Isopropanol distillate[3] | — | −135 | — | — |
| White spirit | — | +135 | — | — |
| Total | 340 | 1110 | 430 | 300 |

-continued

| | | | | |
|---|---|---|---|---|
| Al % | 7.9 | 7.3 | 6.3 | 9.0 |

[1] Al content of 12.9% equivalent to 97% aluminium tri-isopropoxide
[2] Al content of 9.0% equivalent to 98% aluminium tri-ethoxyethoxide
[3] Contains some ethanol attributed to transesterification of ethyl acetoacetate by isopropanol or ethoxyethanol.

2.2 Oxo aluminium compounds

| | 2.2.1 | 2.2.2 |
|---|---|---|
| Aluminium tri-isopropoxide[1] | 420 | — |
| Aluminium tri-ethoxyethoxide[2] | 300 | — |
| Aluminium tri-secbutoxide[3] | — | 252 |
| Aluminium compound Prep. 2.1.3 | — | 60 |
| Ethyl acetoacetate | 390 | 130 |
| Water | 54 | 18 |
| Isopropanol distillate[4] | −434 | — |
| Sec butanol distillate[4] | — | −213 |
| Xylene | 80 | — |
| White Spirit | — | 60 |
| Total | 810 | 307 |
| Al content % | 10 | 10 |

[1] Al content 12.9% equivalent to 97% Al tri-isopropoxide
[2] Al content 9.0% equivalent to 98% Al tri-ethoxyethoxide
[3] Al content 10.7% equivalent to 97.6% tri-sec butoxide
[4] Contains some ethanol attributable to transesterification of ethyl acetoacetate.

2.3 Uncondensed hydroxyl substituted aluminium alkoxide dispersion

| | 2.3.1 |
|---|---|
| Aluminium tri-isopropoxide[1] | 210 |
| Methoxypropanol | 100 |
| Water | 36 |
| Dimethylaminoethanol | 89 |
| Isopropanol | 74 |
| Total | 509 |
| Al content % | 5.3 |

[1] Al content of 12.9% equivalent to 97% aluminium tri-isopoxide

3. Aqueous amine Preparations

| | Amine | Wt. of amine | Water | Total |
|---|---|---|---|---|
| 3.1 | Diethylamine | 73 | 18 | 91 |
| 3.2 | Diethylaminoethanol | 117 | 18 | 135 |
| 3.3 | Dimethylaminoethanol | 89 | 18 | 107 |
| 3.4 | Cyclohexylamine | 99 | 18 | 117 |
| 3.5 | Benzylamine | 107 | 18 | 125 |
| 3.6 | Piperidine | 85 | 18 | 103 |
| 3.7 | Morpholine | 87 | 18 | 105 |
| 3.8 | Monoethanolamine | 61 | 18 | 79 |
| 3.9 | Triethanolamine | 149 | 18 | 167 |

4. Preparations of amine compounds
4.1 Amine salts of carboxylic acids

| | 4.1.1 | 4.1.2 |
|---|---|---|
| Linoleic rich fatty acid | 290 | — |
| Stearic acid | — | 286 |
| Versatic acid 10 | — | 174 |
| Dimethylaminoethanol | 89 | 267 |
| Total | 379 | 727 |

4.2 Ester of an Alkanolamine
4.2.1. Tri(dimethylaminoethyl) orthoborate

| | |
|---|---|
| O—Boric acid | 62 p.b.w. |
| Dimethylaminoethanol | 267 p.b.w. |
| Xylene | 60 p.b.w. |
| Water | −54 p.b.w. |
| Total | 335 p.b.w. |
| Borate content as $B_2O_3$ | 10.4% |
| Dimethylaminoethanol content | 79.7% |

EXAMPLES

The tabulated Examples 1.1 to 1.11; 2.1 to 2.5; 3.1 to 3.7 and 3.8 to 3.12; 4.1 to 4.10; 4.11 to 4.20; 4.21 to 4.28 and 4.29 to 4.31; 5.1 to 5.8 and 6.1 to 6.4 employ, successively, the six coating media derived from oil and alkyd resin Preparations 1.1, 1.2, 1.3, 1.4, 1.5 and 1.6. They include Examples in which the stabilising components comprising hydrated ammonia, amines with and without water addition, or compounds incorporating an amine, are premixed with either the paint medium or with the aluminium compound or with a pre-mix of the paint medium and the aluminium compound. They also include, for comparative purposes, Examples of media of inadequate stability containing an aluminium compound but no effective stabiliser. It is seen that aqueous ammonia and the amines used in the Examples make a significant but variable contribution to the stability of the Examples. The most significant contribution is made by the tertiary alkanolamines dimethylaminoethanol and diethylaminoethanol, by piperidine and by diethylamine and mono n-butylamine. It is possible that the lesser effectiveness of some amines such as benzylamine and cyclohexylamine may be attributed to an associated tendency for them to form, with the medium to which they are added, incompatible reaction products which themselves contribute a thickening effect to the medium. Triethanolamine was particularly unsatisfactory in this respect.

The contribution to stability made by aqueous ammonia or amine/water additions direct to the paint medium, before or after pigmentation, or, indirectly, by pre-mixing the aqueous ammonia or aqueous amine with the aluminium compound, is most apparent when the aluminium compound used in the Example contains residual alkoxide groups.

The use of less water with ammonia or amine is effective in conferring satisfactory stability on compositions using an oxo aluminium compound which may contain little or no residual alkoxide. The addition of water with ammonia or amine, up to the compatibility limits of the paint medium to which the addition of water with ammonia or amine is made, also makes possible a reduction in the amount of ammonia or amine needed without reducing the stability provided.

The contributory effect on stability of alcohol additions as partial replacement for solvents of lower polarity, such as hydrocarbons, is also exemplified. However these additions of alcohol may be disadvantageous in their adverse effect on drying performance under low temperature drying conditions.

The majority of the Examples contain sufficient of the aluminium compound to provide a content of 2% Al, as metal, on the content of the oil or alkyd resin component of the medium. This concentration was chosen because it approximates to the optimum content for such aspects of performance of the applied film as drying properties, the physical characteristics of the dried film, its resistance to water absorption, and its colour stability and gloss retention when subjected to artificial or natural weathering conditions. At this concentration, too, any tendency for the liquid paint to thicken on storage is often most apparent.

Check tests for drying rate were carried out on all the Examples at a wet film thickness of 76μ. These confirmed that Examples using aluminium compounds in conjunction with the preferred amine stabilisers and the required water addition dried better than corresponding Examples containing no aluminium compound. It was also found that the combinations of amine and water which were less effective as stabilisers also tended to have an adverse effect on drying performance.

TABLE I

|  | \multicolumn{11}{c}{Examples 1.1 to 1.11} |
|---|---|---|---|---|---|---|---|---|---|---|---|
|  | 1.1 | 1.2 | 1.3 | 1.4 | 1.5 | 1.6 | 1.7 | 1.8 | 1.9 | 1.10 | 1.11 |
| Polymerised drying oil Prep 1.1 | 100 | 100 | 100 | 100 | 100 | 100 | 100 | 100 | 100 | 100 | 100 |
| White spirit | 50 | 50 | 50 | 50 | 50 | 50 | 50 | 50 | 50 | 50 | 50 |
| 6% Cobalt drier | 1 | 1 | 1 | 1 | 1 | 1 | 1 | 1 | 1 | 1 | 1 |
| 24% lead drier | — | 2.5 | — | — | — | — | — | — | — | — | — |
| Al compound Prep 2.2.1 | — | — | 5 | 10 | 20 | 20 | 20 | 20 | — | — | — |
| Al compound Prep 2.1.3 | — | — | — | — | — | — | — | — | 32 | 32 | 32 |
| Dimethylaminoethanol | — | — | — | — | — | 1 | 2 | 4 | — | 4 | 4 |
| Water | — | — | — | — | — | — | — | — | — | — | 1.2 |
| Viscosity-25° C.-poise |  |  |  |  |  |  |  |  |  |  |  |
| 2 hours | 3 | 3.5 | 4 | 5.5 | 6 | 4 | 4 | 4 | 3.5 | 3 | 2.5 |
| 1 day | 3.5 | 4.5 | 4.5 | 6 | 7.5 | 5 | 4 | 4 | 7 | 4.5 |  |
| 1 week | 3.5 | 5 | 5.5 | 7 | 10 | 6 | 4.5 | 4 | 20 | 7.5 | 3.5 |
| 10 weeks | 4.5 | 7 | 7 | 15 | 40 | 10 | 4.5 | 4.5 | G | 35 | 3 |
| Drying rate-76μ-wet film |  |  |  |  |  |  |  |  |  |  | 2.5 |
| Sand dry - hours | 4.5 | 3.5 | 3.5 | 3.0 | — | 3.0 | 3.0 | 3.5 | — | 5.0 | 5.0 |
| Hard dry - hours | 18 | 16 | 17 | 15 | — | 14 | 14 | 16 | — | 16 | 18 |
| Film properties | v.P | P | F | F/G | — | G | G | G | — | F/G | F/G |
| Water resistance | v.P | v.P | F | G | — | G | G | G | — | G | G | v = very,
P = Poor,
F = Fair,
G = Good.

EXAMPLES 1.1 TO 1.11—TABLE I

Examples 1.1, 1.2, 1.3, 1.4, 1.5 and 1.9 are included for comparative purposes.

After 10 weeks storage Example 1, which contained no aluminium compound, showed no significant change, but there was some thickening of Examples 1.2 and 1.3. There was greater, unacceptable thickening of Examples 1.4 and 1.5 and of 1.9 which had gelled. The addition of increasing amounts of dimethylaminoethanol in 1.6, 1.7 and 1.8 effected increasing stability from 1.6 to 1.7 but the increase in the content of dimethylaminoethanol from 2% in 1.7 to 4% in 1.8 contributed no significant increase in stability and had a slight, adverse effect on drying rate. Dimethylaminoethanol additions alone were insufficient to prevent unacceptable thickening in 1.10 but the addition of water with the dimethylaminoethanol diol stabilise 1.11.

The inclusion of aluminium compounds effects only a slight improvement on drying rate of linseed stand oil media but there is a consistent and major improvement in the properties of the dried film. Water resistance tests carried out on films applied to glass of all the Examples, after 7 days drying, show that the films of Examples 1.1 and 1.2 and had become swollen, wrinkled and detached from the glass substrate after immersion for 7 to 14 days. On withdrawal from the water, film recovery of Examples 1.1 and 1.2 was poor and the dried films were low in decorative and protective value. All the films of the Examples containing aluminium compounds retained their dimensional stability and their adhesion to the glass substrate after 12 weeks immersion. After removal from the water all the films containing the compounds recovered substantially within 24 hours and were adjudged to have protective and decorative value.

TABLE II

|  | \multicolumn{5}{c}{Examples 2.1 to 2.5} |
|---|---|---|---|---|---|
|  | 2.1 | 2.2 | 2.3 | 2.4 | 2.5 |
| Fatty ester Prep 1.2 | 100 | 100 | 100 | 100 | 100 |
| White spirit | 50 | 50 | 50 | 50 | 50 |
| 6% Cobalt drier | 1 | 1 | 1 | 1 | 1 |
| 24% Lead drier | — | 2.5 | — | — | — |
| Al compound Prep 2.1.4 | — | — | 22 | 22 | 22 |
| Dimethylaminoethanol | — | — | — | 4 | 4 |
| Water | — | — | — | — | 1.2 |
| Viscosity-25° C.-poises |  |  |  |  |  |
| After 2 hours | 3.8 | 3.5 | 6.5 | 4 | 4.5 |
| 1 day | 4 | 4.2 | G | 7 | 4 |
| 1 week | 4 | 4.5 | — | 10 | 4 |
| 10 weeks | 4.4 | 6 | — | SG | 4.5 |

G = gelled,
SG = slack gell

EXAMPLES 2.1 TO 2.5—TABLE II

Examples 2.1, 2.2 and 2.3 were included for comparative purposes. In Example 2.3 the addition of the aluminium Prep. 2.1.4 resulted in some local reaction and rapid thickening. Pre-mixing with dimethylaminoethanol (2.4) suppressed thickening but did not prevent it. Premixing with dimethylaminoethanol and water (2.5) provided effective stabilisation.

It proved impracticable to apply a film of 2.3 but films of 2.4 and 2.5 were applied and compared with films of 2.1 and 2.2. Both 2.4 and 2.5 dried better than 2.1 and 2.2 to provide films with better physical properties and greater water resistance.

TABLE III

|  | \multicolumn{7}{c}{Examples 3.1 to 3.7} |
|---|---|---|---|---|---|---|---|
|  | 3.1 | 3.2 | 3.3 | 3.4 | 3.5 | 3.6 | 3.7 |
| Alkyd resin Prep 1.3.1 | ← | ← | ← | 181 | → | → | → |
| Isopropanol | — | 20 | — | — | 15.2 | — | — |
| Ethoxyethanol | — | — | 20 | 16.4 | — | — | — |
| White spirit | 20 | — | — | — | — | 12.7 | 11.1 |
| .880 Ammonium hydrate | — | — | — | 3.6 | — | — | — |
| Diethylamine | — | — | — | — | 3.6 | — | — |
| Diethylaminoethanol | — | — | — | — | — | 7.3 | 7.3 |
| Water | — | — | — | — | 1.2 | — | 1.6 |
| Al. compound Prep 2.1.2 | 27 | 27 | 27 | 27 | 27 | 27 | 27 |
| Viscosity-25° C.-poises |  |  |  |  |  |  |  |
| After 2 hours | G | T | T | 3 | 3.5 | 3.5 | 3.5 |
| 1 day | — | SG | SG | 4 | 4 | 4 | 4 |
| 1 week | — | G | G | 4 | 4 | 6 | 5 |

TABLE III-continued

| | Examples 3.1 to 3.7 | | | | | | |
|---|---|---|---|---|---|---|---|
| | 3.1 | 3.2 | 3.3 | 3.4 | 3.5 | 3.6 | 3.7 |
| 10 weeks | — | — | — | 4 | 3 | 15 | 4 |

G = Gelled
T = Thick
SG = Slack Gell

EXAMPLES 3.1 TO 3.7—TABLE III

Examples 3.1, 3.2 and 3.3 were included for comparative purposes. 3.1 gelled during the addition of Al. compound 2.1.2 to the white spirit diluted alkyd resin Prep. 1.3.1. In 3.2 and 3.3 the replacement of the added white spirit diluent by isopropanol and ethoxyethanol respectively delayed but failed to prevent gelation within 1 week.

In 3.4 the solution of ammonium hydrate in ethoxyethanol proved to be an effective stabiliser, as did the diethylamine/water solution in ethoxyethanol (3.5). In 3.6 the addition of the diethylaminoethanol to the white spirit diluted alkyd resin Prep. 1.3.1 retarded thickening but insufficiently for acceptable stabilisation. The further addition of water (3.7) as an effective replacement for white spirit in 3.6 provided acceptable stabilisation.

The stabilised Examples were applied to glass plates at a wet film thickness of 76μ and tested for drying. 3.5, 3.6 and 3.7 were acceptable in drying rate and provided tack-free films of high quality and good water resistance. The drying rate of 3.4 was much less satisfactory. The dried film had a pronounced "after-tack" and developed an unacceptable yellow discoloration.

TABLE IV

| | Examples 3.8 to 3.12 | | | | |
|---|---|---|---|---|---|
| | 3.8 | 3.9 | 3.10 | 3.11 | 3.12 |
| Alkyd resin Prep. 1.3.1 | ← | ← | 181 | → | → |
| White spirit | 20 | 10.7 | 13.4 | 12.1 | 15.5 |
| Methoxypropanol | — | 5 | — | — | — |
| Mono n-butylamine | — | 3 | — | — | — |
| Dimethylaminoethanol | — | — | 6.6 | 6.6 | 3.7 |
| Water | — | 1.3 | — | 1.3 | 0.8 |
| Al. compound Prep. 2.2.1 | 20 | 20 | 20 | 20 | 20 |
| Viscosity-25° C.-poises | | | | | |
| After 2 hours | 7 | 3 | 3 | 2.5 | 3 |
| 1 day | G | 5 | 4 | 3 | 3.5 |
| 1 week | — | 4 | 3 | 2.5 | 3.5 |

TABLE IV-continued.

| | Examples 3.8 to 3.12 | | | | |
|---|---|---|---|---|---|
| | 3.8 | 3.9 | 3.10 | 3.11 | 3.12 |
| 10 weeks | — | 4 | 4 | 2.5 | 3 |

EXAMPLES 3.8 TO 3.12—TABLE IV

Example 3.8 was included for comparative purposes. The stabilising systems used in 3.9, 3.10, 3.11 and 3.12 all proved effective.

Drying tests on films applied at a wet film thickness of 76μ also confirmed that these stabilised media dried acceptably to provide films of good quality. 3.10 and 3.11 were slightly slower drying than 3.9 and 3.12 and, when immersed in water, proved to have a slightly higher water absorption. This suggests that the lower equivalent amine content of 3.9 and 3.12 is acceptable in its contribution to stability and preferable in other respects which may be adversely affected by excessive additions of amine.

TABLE V

| | | Examples 4.1 to 4.10 | | | | | | | | | |
|---|---|---|---|---|---|---|---|---|---|---|---|
| | | 4.1 | 4.2 | 4.3 | 4.4 | 4.5 | 4.6 | 4.7 | 4.8 | 4.9 | 4.10 |
| Alkyd resin Prep. | 1.4.1. | ← | ← | ← | 183 | → | → | ← | ← | 183 | → |
| Aqueous amine Prep | 3.1 | 7 | — | — | — | — | — | — | — | — | — |
| | 3.2 | — | 10 | — | — | — | — | — | — | — | — |
| | 3.3 | — | — | 8 | — | — | — | — | — | — | — |
| | 3.4 | — | — | — | 9 | — | — | — | — | — | — |
| | 3.5 | — | — | — | — | 9 | — | — | — | — | — |
| | 3.6 | — | — | — | — | — | 8 | — | — | — | — |
| | 3.7 | — | — | — | — | — | — | 8 | — | — | — |
| | 3.8 | — | — | — | — | — | — | — | 6 | — | — |
| | 3.9 | — | — | — | — | — | — | — | — | 12 | — |
| Al. compound Prep | 2.2.2 | 20 | 20 | 20 | 20 | 20 | 20 | 20 | 20 | 20 | 20 |
| Viscosity-25° C.-poises | | | | | | | | | | | |
| After 2 hours | | 2 | 2 | 2 | 3 | 5 | 2.5 | 2.5 | 4 | IC | 2 |
| 3 days | | 2 | 2 | 2— | 10+ | VT | 3 | 5 | 15— | — | 7 |
| 1 week | | 2.5 | 2 | 2 | 40 | VT | 3.5 | 7 | 15+ | — | 10 |
| 5 weeks | | 3+ | 2.5— | 2.5— | VT | VT | 4 | 10 | VT | — | 30 |
| 18 weeks | | 2.5— | 1.5 | 1+ | VT | VT | 3 | T | VT | — | G |

T = Thick;
VT = Very Thick;
IC = Incompatible;
G = Gelled.

EXAMPLE 4.1 TO 4.10—TABLE V

Example 4.10 was included for comparative purposes. Examples 4.1 to 4.9 compare the contribution to stability of stoichiometric additions of nine amines hydrated with molar equivalents of water when used with the specific alkyd/aluminium compound medium 4.10 of known, unacceptable stability.

Examples 4.1, 4.2, 4.3 and 4.6 each proved acceptable in stability, in compatibility (Clarity), and in drying performance. 4.7 also proved acceptable in drying performance but unacceptable in compatibility and stability. The others failed to satisfy the performance criteria.

The result of this limited comparison suggests a possible link between compatibility (clarity), stability and drying performance which may be affected by choice of solvent and other aspects of composition including the resinous component of the medium.

TABLE VI

| | Examples 4.11 to 4.20 | | | | |
|---|---|---|---|---|---|
| | 4.11 | 4.12 | 4.13 | 4.14 | 4.15 |
| Titanium dioxide pigment | ← | ← | 80 | → | → |
| Alkyd resin Prep 1.4.1 | ← | ← | 183 | → | → |
| Dimethylaminoethanol | — | 6.6 | 6.6 | 6.6 | 3.3 |

TABLE VI-continued

Examples 4.11 to 4.20

| | | 4.11 | 4.12 | 4.13 | 4.14 | 4.15 |
|---|---|---|---|---|---|---|
| Water | | — | — | 1.3 | 2 | 1.3 |
| Al compound | Prep 2.1.1 | 25 | 25 | 25 | 25 | 25 |
| " | Prep 2.1.2 | — | — | — | — | — |
| " | Prep 2.1.3 | — | — | — | — | — |
| Viscosity-25° C.-poises | | | | | | |
| After | 2 hours | 15 | 7 | 4 | 3.5 | 4.5 |
| | 3 days | G | •10 | 4 | 4 | 5 |
| | 1 week | — | 12 | 5 | 3.5 | 4.5 |
| | 4 weeks | — | 15 | 4 | 3 | 5 |
| | 16 weeks | — | 25 | 5 | 2.5 | 5 |

| | 4.16 | 4.17 | 4.18 | 4.19 | 4.20 |
|---|---|---|---|---|---|
| Titanium dioxide pigment | ← | ← | 80 | → | → |
| Alkyd resin Prep 1.4.1 | ← | ← | 183 | → | → |
| Dimethylaminoethanol | 3.3 | 3.3 | — | — | 6.6 |
| Water | 2 | 2 | — | 2.6* | 2.6 |
| Al compound Prep 2.1.1 | 25 | — | — | — | — |
| " Prep 2.1.2 | — | 27 | — | — | — |
| " Prep 2.1.3 | — | — | 32 | 32 | 32 |
| Viscosity-25° C.-poises | | | | | |
| After 2 hours | 4.5 | 4 | 6 | 3.5 | 2.5 |
| 3 days | 4 | 3.5 | 25 | 4.5 | 3.5 |
| 1 week | 4 | 4 | SG | 6 | 2.5 |
| 4 weeks | 4.5 | 4.5 | G | 10 | 2 |
| 16 weeks | 4.5 | 4.5 | — | 20 | 1.5 |

*Water pre-mixed with Al. compound 2.1.3

EXAMPLES 4.11 TO 4.20—TABLE VI

Examples 4.11, 4.12, 4.18 and 4.19 were included for comparative purposes. It is possible that the thickening of Example 4.12 may have been retarded by the moisture content of the titanium dioxide pigmented estimated at 0.35% of the pigment weight. This would correspond to 0.28% of the weight of the non-volatile alkyd resin content of Example 4.12.

Examples 4.13, 4.14, 4.15, 4.16, 4.17 and 4.20 are all stabilised satisfactorily but the lower content of dimethylaminoethanol used in 4.15 and 4.16 has provided adequate stability and is to be preferred. The amine/water solution may be pre-mixed with either the alkyd medium or with the aluminium compound, but the pre-mix with the alkyd medium has been found to be preferable as an aid to improved pigment wetting and dispersion. It also takes advantage of the heat produced in the pigment dispersion process to bring about more rapid reaction between the amine and the reactive groups in the alkyd with which it is thought to associate.

The stabilised Examples were applied to glass plate at a wet film thickness of 76μ and tested for drying and film properties. All were acceptable in drying rate and film quality but 4.20 was the slowest drying and had the most pronounced and prolonged "aftertack". This was attributed to a combination of the effect of its high content of ethoxyethanol and a higher than necessary content of dimethylaminoethanol and water used as stabiliser.

TABLE VII

| | Examples 4.21 to 4.28 | | | | | | | |
|---|---|---|---|---|---|---|---|---|
| | 4.21 | 4.22 | 4.23 | 4.24 | 4.25 | 4.26 | 4.27 | 4.28 |
| Alkyd resin Prep 1.4.1 | ← | ← | ← | 183 | → | → | → | → |
| Dimethylaminoethanol | — | 2.5 | 2.1 | 1.9 | 1.8 | — | 3.3 | 3.3* |
| Water | — | — | 0.4 | 0.6 | 0.7 | — | 0.9 | 0.9* |
| Al. compound Prep 2.2.1 | 20 | 20 | 20 | 20 | 20 | — | — | — |
| Al. compound Prep 2.2.2 | — | — | — | — | — | 20 | 20 | 20 |
| Viscosity-25° C.-poises | | | | | | | | |
| after 1 day | 5 | 3.5 | 2 | 2 | 2 | 4 | 2.5 | 2.5 |
| 1 week | 7 | 4 | 2.5 | 2.5 | 2.5 | 7 | 2.5 | 3 |
| 4 weeks | 10 | 5 | 2+ | 2+ | 2 | 15 | 2.5+ | 2.5+ |
| 12 weeks | 22 | 5.5 | 2.5 | 2.5 | 2+ | 55 | 3 | 2.5+ |

*Dimethylaminoethanol and water pre-mixed with Al. compound 2.2.2.

EXAMPLES 4.21 TO 4.28—TABLE VII

Examples 4.21 and 4.26 were included for comparative purposes.

Examples 4.22 and 4.25 explore the effect of varying the proportions in which the amine and water component are used to stabilise the blend of alkyd medium and aluminium compound represented by Example 4.21. The stability results on Examples 4.23, 4.24 and 4.25 indicate that equal weights of amine/water solution varying in molar proportions from 2:1 to 2:3 have a similar stabilising action. These three Examples are also seen to be significantly more stable than Example 4.22 which uses the amine without the water addition.

Example 4.27 and 4.28 compare the effect on stabilising efficiency of pre-mixing the amine/water solution with the alkyd medium (4.27) and with the aluminium compound (4.28). The results suggest that when the aluminium compound is an oxo compound such as 2 2.2 there is no significant difference in stabilising efficiency.

Drying tests on the stabilised Examples were satisfactory and the dried films were of uniformly good quality.

TABLE VIII

| | Examples 4.29 to 4.31 | | |
|---|---|---|---|
| | 4.29 | 4.30 | 4.31 |
| Alkyd resin Prep 1.4.1 | ← | 183 | → |
| Amine compound Prep 4.1.1 | 15 | — | — |
| " Prep 4.1.2 | — | 9 | — |
| " Prep 4.2.1 | — | — | 5 |
| Water | — | 1.3 | — |
| White spirit | — | — | 20 |
| Carbon black pigment | 3 | — | — |
| Micaceous iron oxide pigment | — | — | 320 |
| Al. compound Prep 2.1.1 | — | 25 | — |
| " Prep 2.2.1 | 20 | — | — |
| " Prep 2.2.2 | — | — | 20 |
| Viscosity-25° C.-poises | | | |
| After 1 day | 3.5+ | 2.5— | 4.5 |
| 1 week | 4 | 2.5 | 5 |
| 20 weeks | 4.5+ | 3 | 4.5+ |

EXAMPLES 4.29 AND 4.32 - TABLE VIII

These three Examples use and demonstrate the effectiveness of amine compounds in stabilising coating compositions employing the alkyd medium Prep 1.4.1 with three different aluminium compounds.

In Example 4.29 the amine compound 4.1.1 was used both as a wetting and dispersing medium for the carbon black pigment and as the stabiliser for the composition. In both roles it was effective. The black paint had acceptable stability and dried satisfactorily to provide a decorative and protective coating of high quality.

In Examples 4.30 the amine compound was first mixed with the water and then added, with stirring, to the aluminium compound Prep 2.1.1. The final blend with the alkyd medium had acceptable storage stability and provided a hard drying, water repellent film, having good polishing properties.

In Example 4.31 the micaceous iron oxide pigment was first dispersed in the alkyd medium by high speed stirring. The amine compound Prep 4.2.1 was added followed by the aluminium compound 2.2.2. and the diluent white spirit. The resulting paint had satisfactory storage stability and dried well to provide a durable protective coating.

TABLE IX

|  | Examples 5.1 to 5.8 | | | | | | | |
|---|---|---|---|---|---|---|---|---|
|  | 5.1 | 5.2 | 5.3 | 5.4 | 5.5 | 5.6 | 5.7 | 5.8 |
| Alkyd medium Prep 1.5.1 | ← | ← | ← | ← | 221 | → | → | → |
| Methoxypropanol | — | — | — | — | — | 5 | — | — |
| Dimethylaminoethanol | — | 6.6 | 6.6 | 3.3 | 3.3 | 3.3 | 6.6 | 3.3 |
| Water | — | — | 1.3 | 2.0 | 2.0 | — | 1.3 | 1.3 |
| Al compound Prep 2.1.1 | 25 | 25 | 25 | 25 | — | — | — | — |
| Al compound Prep 2.1.4 | — | — | — | — | 27 | — | — | — |
| Al compound Prep 2.2.1 | — | — | — | — | — | 20 | 20 | 20 |
| Viscosity-25° C.-poises | | | | | | | | |
| After 1 day | G | 7 | 3.5 | 3.5 | 3 | 1.5 | 3 | 4 |
| 1 week | — | G | 3.5+ | 3.5 | 2.5 | 1.5 | 3+ | 4+ |
| 4 weeks | — | — | 5 | 4 | 3 | 2 | 3+ | 4+ |
| 12 weeks | — | — | 6+ | 4.5 | 3.5 | 1.5+ | 4 | 5— |

EXAMPLES 5.1 TO 5.8—TABLE IX

Examples 5.1 to 5.2 are included for comparative purposes. The rapid gelation of Example 5.1 highlights the problem of stabilising hydrocarbon solutions of resins of this type having a lower oil content and higher average molecular weight when they are used with aluminium compound.

The rapid thickening of Example 5.2 exemplifies the inadequate contribution to stability made by dimethylaminoethanol when used alone. The inclusion of water with the amine provides greater stability and makes possible the reduction in dimethylaminoethanol content in Examples 5.4, 5.5, 5.6 and 5.8. Example 5.6 which uses the oxo aluminium compound Prep 2.2.1 is stabilised statisfactorily at a lower viscosity level, by replacing the water content of Example 5.8 by a larger amount of methoxypropanol which combines some of the peptising action of water with a more powerful solvating action for the resin.

All the stabilised Examples were applied to glass plates at a wet film thickness of 76μ and tested for drying. They dried hard in about 1½ hours to provide films of excellent hardness and adhesion, good resistance to water and solvent and excellent durability.

TABLE X

|  | Examples 6.1 to 6.4 | | | |
|---|---|---|---|---|
|  | 6.1 | 6.2 | 6.3 | 6.4 |
| Alkyd resin Prep 1.6.1 | — | 1000 | — | — |
| " Prep 1.6.2 | 1000 | — | 1000 | — |
| " Prep 1.6.3 | — | — | — | 1000 |
| 6% Cobalt drier | 7 | 7 | 7 | 7 |
| Xylene | — | 200 | — | — |
| Solvesso 150* | — | 200 | — | — |
| Al compound Prep 2.1.3 | — | — | 220 | — |
| " Prep 2.2.1 | — | 150 | — | — |
| " Prep 2.3.1 | — | — | — | 270 |
| Water | 1960 | — | 1960 | 1960 |
| Titanium dioxide pigment | 500 | 500 | 500 | 500 |

*Proprietary aromatic solvent with boiling point ca 195° C., supplied by ESSO.

EXAMPLES 6.1 TO 6.4—TABLE X

Example 6.1 contains no aluminium compound and was included for comparative purposes. Examples 6.2, 6.3 and 6.4 all contain aluminium compounds and exemplify two uses with aluminium compounds of the highly acidic and reactive resin, Preparation 1.6 in organic solvent and water reducible applications. Example 6.2 is formulated to provide a storage stable aluminium/resin composite solution as a medium for rapid air-drying and durable industrial coatings.

Examples 6.3 and 6.4 provide environmentally desirable, water reducible coatings which incorporate aluminium compounds to provide a cross-linking capability additional to that available through the drying oil content of the resin. This contributes improved drying performance and enhanced durability.

I claim:

1. A coating composition comprising
   (i) a paint medium which may be pigmented or unpigmented and which includes a drying or semi-drying oil, an oil-soluble resin, an oil-modified alkyd resin, or mixtures thereof,;
   (ii) at least one aluminum compound which is an aluminum alkoxide or a compound derived from an aluminum alkoxide by an addition, substitution or condensation reaction;
   (iii) a primary stabilizer comprising at least one volatile base selected from ammonia, aqueous ammonia, an alkylamine, a cycloalkylamine, an arylamine, an alkanolamine and compounds thereof which by dissociation or hydrolysis release ammonia or an amine; and
   (iv) an additional stabilizer comprising added water in an amount not greater than one mole of water for each alkoxide group present in the aluminum alkoxide compound or in the aluminum alkoxide from which the aluminum compound is derived.

2. A coating composition according to claim 1, wherein the primary stabiliser 1.(iii) has a boiling point within the range of from 40° C. to 240° C.

3. A coating composition according to claim 2, wherein the primary stabiliser 1.(iii) is selected from ammonia, an alkylamine, a cycloalkylamine, an alkanolamine, and compounds thereof which by dissociation or hydrolysis release ammonia or an amine and mixtures thereof.

4. A coating composition according to claim 3, wherein the primary stabiliser 1.(iii) comprises dimethylaminoethanol or diethylaminoethanol.

5. A coating composition according to claim 1, wherein the aluminium compound 1.(ii) has the general formula $AlX_3$ where X is an alkoxide, a cycloalkoxide, a substituted alkoxide, a phenoxide or an alkyl, aryl or halogenated phenoxide, the enolate from a beta diketone, a beta keto-carboxylic ester or a malonic ester, an aryloxide, or an acyloxide.

6. A coating composition according to claim 1, wherein the aluminum compound 1.(ii) has the general formula $(-O_p-Al-X_q)r$ where X is an alkoxide, a cycloalkoxide, a substituted alkoxide, a phenoxide or an alkyl, aryl or halogenated phenoxide, the enolate from a beta diketone, a beta keto-carboxylic ester or a malonic ester, an aryloxide, or an acyloxide, and r is 2 or more, p is less than 1.5 and not less than 0.5 and q is 3-2p.

7. A coating composition according to claim 1, wherein the aluminium compound 1.(ii) is an aluminium alkoxide.

8. A coating composition according to claim 1, wherein the aluminium compound is present in an amount of 0.5% to 8% Al by weight based on the nonvolatile components of the medium.

9. A reaction product obtained by mixing together
(i) at least one aluminum compound which is an aluminum alkoxide or a compound derived from an aluminum alkoxide by an addition, substitution or condensation reaction;
(ii) a primary stabilizer comprising at least one volatile base selected from ammonia, aqueous ammonia, an alkylamine, a cycloakylamine, an arylamine, an alkanolamine and compounds thereof which by dissociation or hydrolysis release ammonia or an amine; and
(iii) an additional stabilizer comprising added water in an amount not greater than one mole of water for each alkoxide group present in the aluminum alkoxide compound or in the aluminum alkoxide from which the aluminum compound is derived.

10. A coating composition according to claim 1, further including a surface drier for the paint medium.

* * * * *